April 20, 1948.  G. SIMONIAN  2,439,992
FOLDING, WHEELED, SHOPPING BAG
Filed Aug. 31, 1946  2 Sheets-Sheet 1
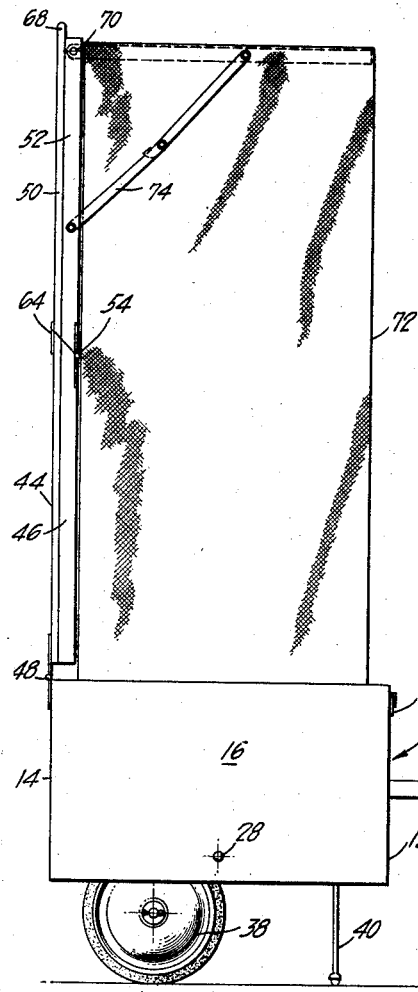
FIG_1_
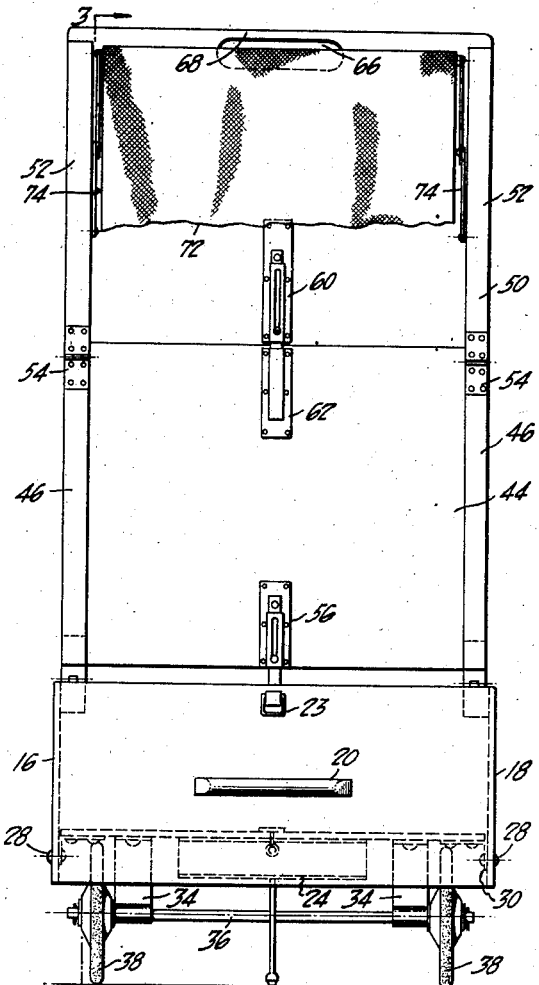
FIG_2_
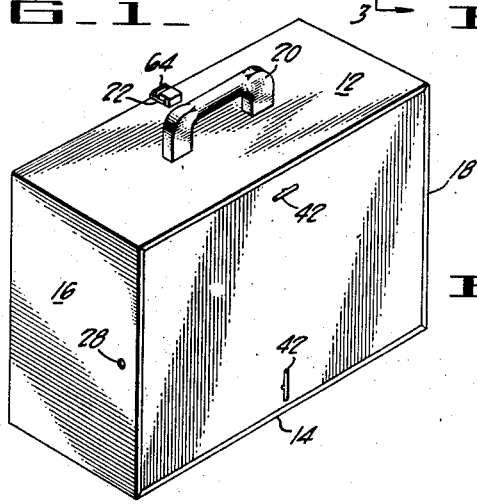
FIG_3_
INVENTOR.
Gerald Simonian
BY
*Naylor and Lasagne*
ATTORNEYS April 20, 1948.  G. SIMONIAN  2,439,992
FOLDING, WHEELED, SHOPPING BAG
Filed Aug. 31, 1946  2 Sheets-Sheet 2
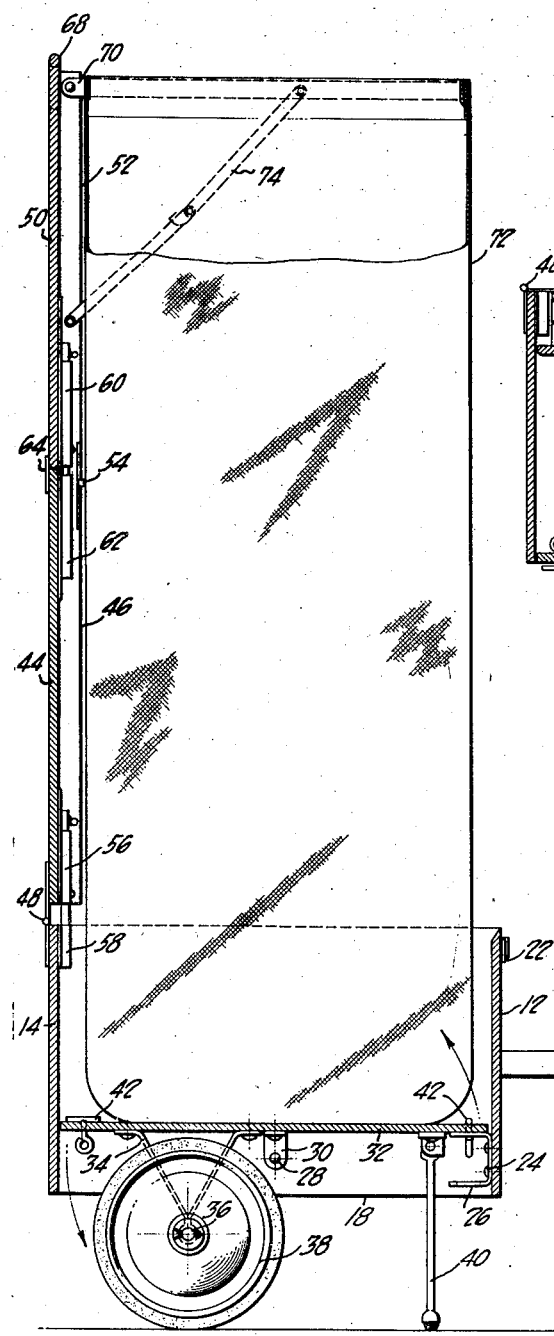
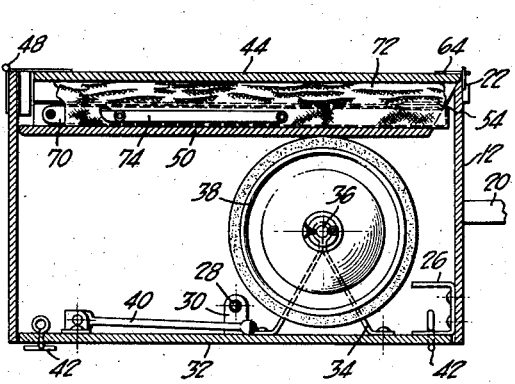
FIG_4_
FIG_3_
INVENTOR.
Gerald Simonian
BY
ATTORNEYS Patented Apr. 20, 1948

2,439,992

UNITED STATES PATENT OFFICE 2,439,992

FOLDING, WHEELED, SHOPPING BAG

Gerald Simonian, Fresno, Calif.

Application August 31, 1946, Serial No. 694,279

3 Claims. (Cl. 280—37)

This invention relates to shopping bags, and more particularly to a vehicular shopping bag.

An object of the invention is to provide a foldable vehicular shopping bag which may be compacted when not in use to occupy a minimum of space.

Another object of the invention is to provide a foldable vehicular shopping bag which may be readily and conveniently hand carried when it is in its folded condition.

Other objects and advantages of the invention will be apparent from the following description when taken in conjunction with the drawings forming part of this specification, and in which:

Fig. 1 is a view in side elevation of the preferred embodiment of the invention;

Fig. 2 is a view in front elevation partly broken away of the shopping bag of Fig. 1;

Fig. 3 is an enlarged view in section taken along line 3—3 of Fig. 2;

Fig. 4 is a view in section, taken along the plane of line 3—3 of Fig. 2, showing the shopping bag in its folded condition; and Fig. 5 is a view in perspective of the preferred embodiment of the invention in its compacted condition.

Referring to the drawings for more specific details of the invention, 10 indicates generally a housing having front and rear walls 12 and 14 and side walls 16 and 18. Attached to the outside of the front wall 12 are a carrying handle 20 and a locking catch 22, while secured to the inside of the wall 12 is a U-shaped locking bracket 24 having the arms thereof slotted, as at 26. Secured to the side walls 16 and 18 by rivets 28 are a pair of pivotable angle strips 30 supporting a panel 32. The panel 32 has secured to one side thereof a pair of spaced brackets 34 supporting an axle 36 having mounted for rotation thereon a pair of rubber tired wheels 38. A pivotable leg support 40 is also secured to the panel 32, and rotatable fasteners 42 are carried by the panel at each end thereof.

A panel 44 having reinforcing ribs 46 at the outer edges thereof is pivotably secured to the rear wall 14 of the housing 10 by hinges 48, and an upper panel 50 having reinforcing ribs 52 is secured to the panel 44 by hinges 54. The panel 44 has a sliding bolt locking means 56 adapted to cooperate with guide means 58 carried by the wall 14 of the housing 10, and the upper panel 50 has a sliding bolt locking means 60 adapted to cooperate with guide means 62 carried by the panel 44. A locking tongue 64 is secured to the outside surface of panel 44 hereinafter disclosed, and the upper portion of panel 50 is apertured as at 66 to provide a handle 68.

A U-shaped stay 70 is pivotally secured to the inside surfaces of ribs 52 of panel 50, said stay 70 being threaded through a peripheral fold of a canvas bag 72 extending downwardly to the panel 32 within the housing 10. A foldable brace support 72 is pivotally secured to the ribs 52 and the stays 70 to selectively maintain the bag 72 in an open and distended position of Fig. 1.

When the vehicular shopping bag is in the position of Figs. 1 to 3, it may be freely wheeled by the shopper by tilting the device by means of handle 68 to disengage the leg support 40 from the floor surface. The leg 40 provides for the self-support of the device when the bag 72 is in the vertical position. When groceries or the like are placed within the bag 72, the weight of the articles is supported by panel 32 which is locked against rotation by engagement of a fastener 42 within a slot 26 in the bracket 24, as indicated in Fig. 3.

Following removal of the articles from the bag 72, the device may be compacted to the form shown in Figs. 4 and 5 in the following manner: The freely hanging bag 72 is folded or bunched upwardly against the stay 70; the support braces 74 are deflected at their middle pivot point to free them from their locked position; the stay 70 and bag 72 are then pivoted downwardly adjacent the panel 50 into the space between the ribs 52 following the freeing of the bolt of the locking means 60 from the guide means 62 and the freeing of the bolt of the locking means 56 from the guide means 58; panel 50 is then pivoted downwardly against panel 44 so that the ribs 52 and the ribs 46 are adjacently disposed and so that the panels 44 and 50 include therebetween the bag 72; panel 44 is then pivoted downwardly to serve as a closure for the housing 10 and the locking tongue 64 is engaged by the locking catch 22; the leg support 40 is folded inwardly adjacent the panel 32 and the fastener 42 is pivoted so that the loop thereof is in alignment with the slot 26 of the locking bracket 24; the panel 32 is rotated to the position shown in Fig. 4 and the fastener 42 is rotated into locking engagement with the locking bracket 24.

While the preferred embodiment of the invention has been shown and described, it is understood that the embodiment shown is subject to modification within the scope of the appended claims.

What I claim is new and desire to secure by Letters Patent is:

1. A vehicular shopping bag comprising a housing, a pair of wheels supporting said housing, a leg adapted to coact with said wheels for the static support of said housing, a two section panel foldable upon itself pivotally secured to the housing, a stay pivotally secured to the upper edge of the upper panel section, a bag depending from said stay and extending within said housing, means to lock said panel sections in alignment normal to the upper edge of the housing, and means to lock said stay in position normal to said panel.

2. A vehicular shopping bag comprising a housing, a reversible panel as the bottom thereof, a two section panel foldable in the center as the top thereof, a bag pivotably secured to the free end of said latter panel and adapted to lie between said panel sections when said sections are folded, a pair of wheels and a pivotable leg support on one side of the reversible panel, means to selectively lock said reversible panel in either of two positions to expose or enclose said wheel side of said panel, means to selectively lock said panel sections in alignment normal to the housing, and means to selectively lock said bag in a vertical open position.

3. A vehicular shopping bag comprising a boxlike housing, a reversible panel as the bottom thereof, a pair of wheels and a pivotable leg support carried on one side of said panel, locking means selectively operable to secure said panel in horizontal position with either side thereof exposed, a panel foldable upon itself in the middle and having one end pivotably secured to the upper edge of a wall of the housing, a stay pivotably secured to the free end of said foldable panel, a bag having its open end secured to said stay, means to selectively lock said panel sections in alignment normal to the upper edge of said housing, and means to selectively lock said stay in position normal to said panel sections to allow the closed end of said bag to extend downwardly into said housing to contact the side of said reversible panel opposite said wheels.

GERALD SIMONIAN.

REFERENCES CITED

The following references are of record in the file of this patent:

UNITED STATES PATENTS

| Number | Name | Date |
|---|---|---|
| 1,442,733 | Paschoal | Jan. 16, 1923 |
| 1,718,962 | Kimball | July 2, 1929 |

FOREIGN PATENTS

| Number | Country | Date |
|---|---|---|
| 305,336 | Great Britain | Feb. 7, 1929 |